July 17, 1951     S. G. BLUMENSAADT ET AL     2,560,842
WIRE SPRING STRUCTURE FOR SEAT CONSTRUCTIONS
Filed March 27, 1946     2 Sheets-Sheet 2
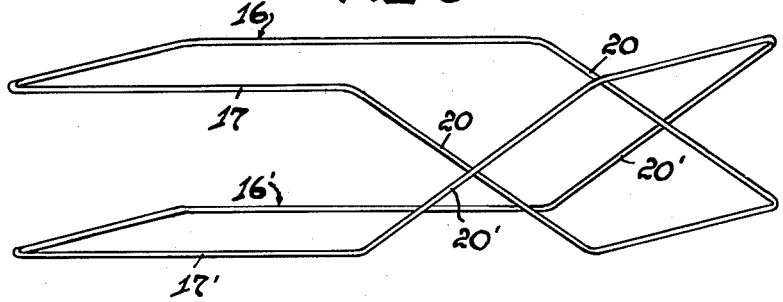
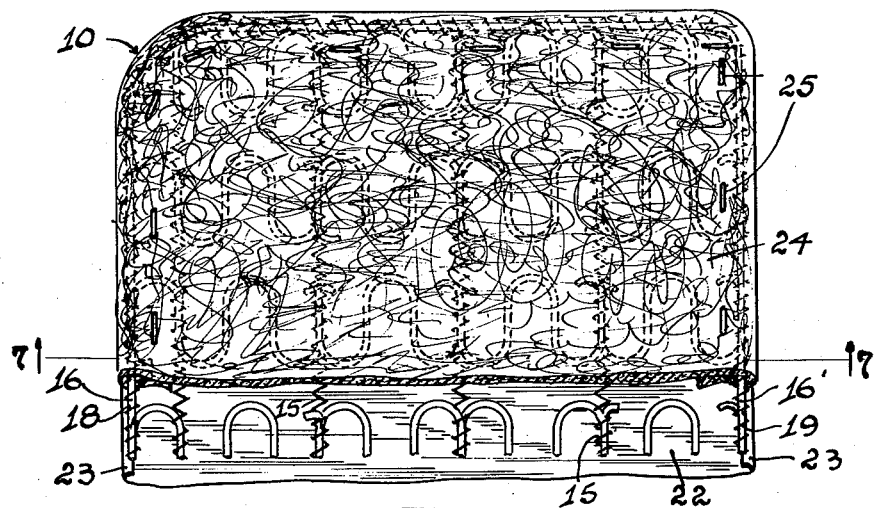
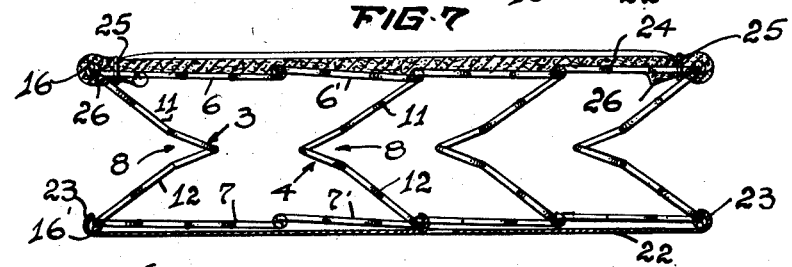
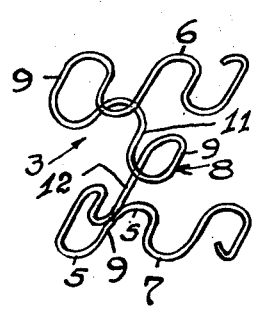 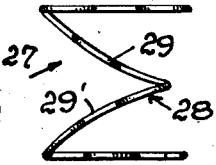
INVENTORS:
SVEND G. BLUMENSAADT
WILLIAM H. NEELY
NORMAN A. PAGE
BY Gustav A. Wolff. ATT.

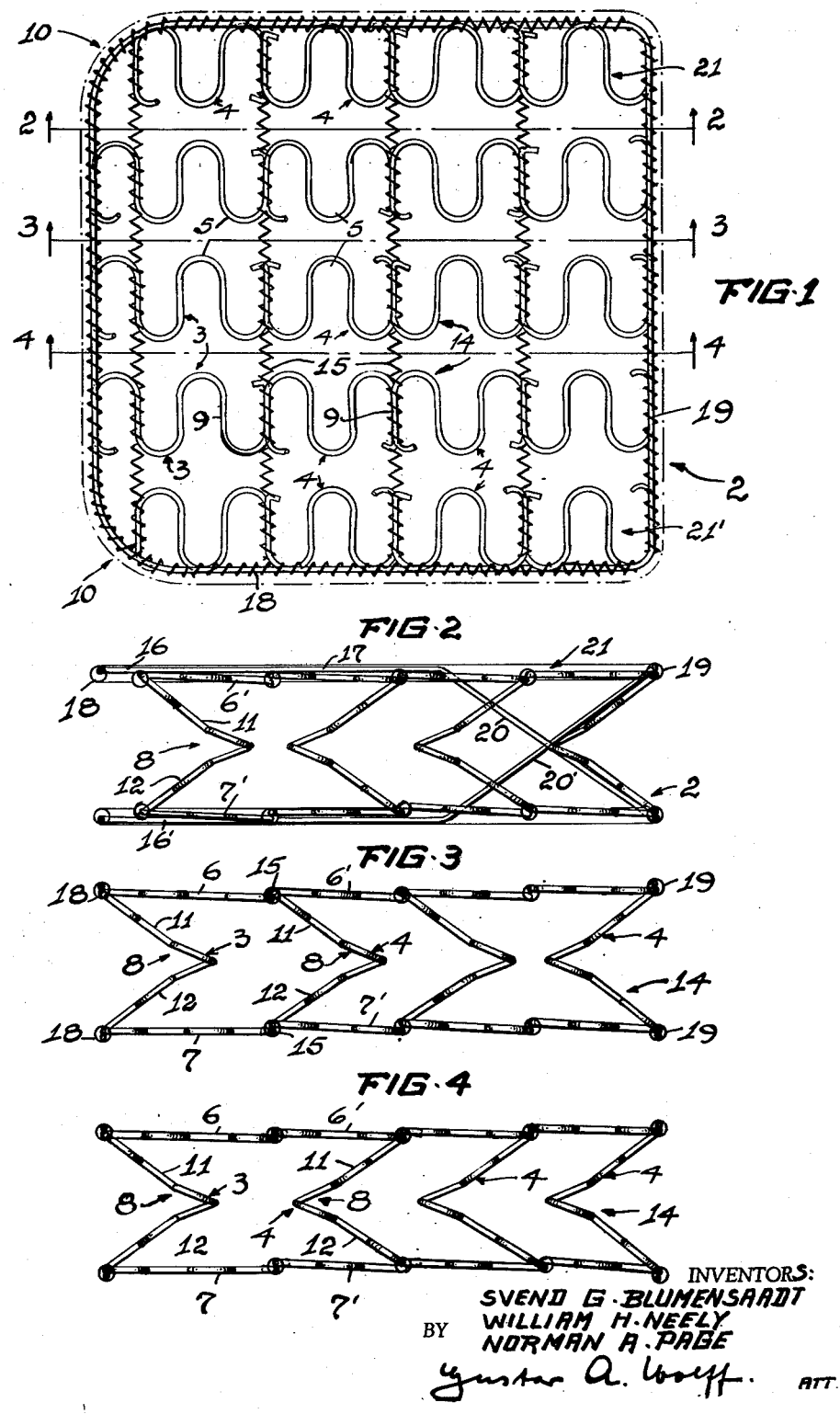

Patented July 17, 1951

2,560,842

UNITED STATES PATENT OFFICE

2,560,842

WIRE SPRING STRUCTURE FOR SEAT CONSTRUCTIONS

Svend G. Blumensaadt, Beachwood Village, and William H. Neely and Norman A. Page, Cleveland, Ohio, assignors to Universal Wire Spring Company, Cleveland, Ohio, a corporation of Ohio Application March 27, 1946, Serial No. 657,476

11 Claims. (Cl. 155—179)

This invention related in general to wire spring constructions for cushioned seat structures in vehicles and the like, and more particularly to spring constructions embodying individual spring elements interconnected with each other to form readily yielding spring units.

The general object of the present invention is the provision of a simplified spring unit of the type referred to above which embodies a plurality of M-shaped, sinuously corrugated wire springs coupled with each other to form a spring structure with substantially parallel, yielding top and bottom surfaces yieldingly spaced from each other by the V-shaped yielding portions of the springs, in which spring unit the top and bottom surfaces are substantially encircled by symmetrically arranged cooperating edge wire members, each of which partly encircles these surfaces and yieldingly braces same with respect to each other.

Another object of the invention is the provision of a spring unit of the type referred to above which embodies a plurality of M-shaped, sinuously corrugated wire springs coupled with each other to form a spring structure with substantially parallel, yielding top and bottom surfaces yieldingly spaced from each other by V-shaped yielding portions of the springs, the V-shaped portions being formed with angularly bent arms to reduce the angle between said arms and permit full compression of the springs under excessive loads tending to bend these arms.

A further object of the invention is the provision of a spring unit of the type referred to above which embodies a plurality of M-shaped, sinuously corrugated wire springs coupled with each other to form a spring structure with substantially parallel, yielding top and bottom surfaces yieldingly spaced from each other by the V-shaped yielding portions of the springs, in which spring unit the surfaces are substantially encircled by invertedly arranged symmetrical edge wire members engaging the top and bottom surfaces and bracing symmetrical areas of these surfaces with respect to each other.

In addition, the invention has certain other marked superiorities which radically distinguish it from presently known structures. These improvements, embodying certain novel features of construction, are clearly set forth in the following specification and the appended claims; and a preferred form of embodiments of the invention is hereinafter shown with reference to the accompanying drawings forming part of the specification.

In the drawings:

Fig. 1 is a plan view of an assembled spring unit constructed in accordance with the invention.

Fig. 2 is a cross sectional view on line 2—2 of Fig. 1.

Fig. 3 is a cross sectional view on line 3—3 of Fig. 1; and

Fig. 4 is a view partly in section on line 4—4 of Fig. 1 of a central spring row.

Fig. 5 is a perspective view of the edge wire members encircling the top and bottom surfaces of the spring unit shown in Fig. 1, the edge wire members being disclosed in their proper relation when arranged in an assembled spring unit.

Fig. 6 is a fragmentary plan view of the assembled spring unit shown in Fig. 1, covered with a layer of felt and mounted on a metal panel.

Fig. 7 is a partly cross sectional view on line 7—7 of Fig. 6 of the cover layer and the central spring row.

Fig. 8 is a perspective view of one of the M-shaped, sinuously corrugated wire springs used in the assembled spring unit.

Fig. 9 is a side-view of a modified form of the M-shaped corrugated wire spring.

Referring now in detail to the drawings, spring unit 2 embodies M-shaped, corrugated wire springs 3 and 4 of steel wire bent to sinuous shape so that their loops 5 extend in substantially parallel relationship with respect to each other. These wire springs include parallel top and bottom portions 6, 6' and 7, 7' which are integrally interconnected with each other by V-shaped, corrugated spacer and supporting portions 8. Springs 3 and 4 are formed to M-shape by twisting a sinuously corrugated wire in definite areas which are defined by straight wire portions 9 arranged between adjoining loops 5 so that any deformations of the straight top and bottom portions and the V-shaped spacer and supporting portions of the springs are avoided. The height of the wire springs is the same and all springs are of similar construction, with the exception that top and bottom portions 6, 7 of springs 3 are of greater length than the top and bottom portions 6', 7' of springs 4, an arrangement which permits stiffer support of the rounded front edges 10 of spring unit 2. To stabilize the unit against sway in forward or rearward direction, some of the V-shaped spacer and supporting portions 8 of the springs are opposed to each other, as will best be understood from inspection of Figs. 2 through 4. Preferably, as shown, V-shaped spacer and supporting portions 8 have their arms 11 and 12 bent in definite areas to reduce the angle between said arms and permit bending of these arms without interference with full compression of spring unit 2 under excessive load.

Springs 3 and 4 are placed in alignment and coupled with each other to form a plurality of elongated spring rows 14 which are placed parallel to each other in spaced relation and which extend from the front to the rear of spring unit 2. The springs of these elongated spring rows have the free ends of their top and bottom portions coupled with the upper and lower ends of the V-shaped spacer and supporting portions of adjacent springs to insure proper load resistance of the supporting surface of the spring unit. To that effect, the free ends of the top and bottom portions of the springs and the adjacent portions of adjoining springs are coupled with each other by elongated wire spirals 15 which encircle the free ends and the adjacent portions of adjoining springs and extend across all the spring rows of the spring unit.

The thus formed spring unit is provided with two cooperating edge wire members 16, 16' which are of substantially rectangular outline and have their side members 17, 17' bent to permit coupling of the edge wire members with the top and bottom portions of the assembled spring unit. Edge wire members 16, 16' are inverted with respect to each other and edge wire member 16 is extended through edge wire member 16' to be laterally supported thereby so as to counteract side-sway of the spring unit. The thus constructed and related edge wire members are coupled with springs 3 and 4 by elongated wire spirals 18 and 19 which are threaded upon the front and side edges of the springs and upon the edge wire members. When thus coupled with the elongated spring rows, the inclined portions 20, 20' of the edge wire members form brace members which stiffen outer spring rows 21, 21' and counteract forward and rearward sway of the spring unit.

The described arrangement of springs 3 and 4 and placing of their V-shaped spacer and supporting means in the same or opposed direction control the load resistance of the spring unit, the front part of which has lower load resistance than its rear part, as spring rows 14 include at their front portions springs 3 with longer top and bottom portions 6 and 7 than the top and bottom portions 6' and 7' of springs 4 used for the rear portions of said spring rows.

Spring unit 2 preferably is mounted on a metal panel 22 with curved flanges 23 securely holding the unit in proper position. The top of spring unit 2 is covered by a felt padding 24 which is folded around the border edge of the unit and secured thereto by metal staples 25 extended through the felt padding and its folded portion 26.

In Fig. 9 is shown a somewhat modified form of an M-shaped, sinuously corrugated wire spring 27. This spring includes V-shaped spacer and supporting means 28, the arms 29, 29' of which are curved throughout to effect a reduction of the angle between arms 29 and 29' and permit bending of these arms without interference with full compression of spring 27 under excessive load.

Having thus described our invention, what we claim is:

1. A wire spring construction embodying a plurality of sinuously corrugated, M-shaped wire springs each of which includes substantially parallel top and bottom portions lying in horizontal planes when said construction is assembled and a substantially sharp-edged, V-shaped spacer and connecting portion having its inclined arms bent in localized areas near the apex of said V-shaped, connecting portion to increase the divergence of the outer portions of said arms over the divergence of the inner portions thereof, and means coupling said springs in axial alignment with each other to form elongated spring structures having substantially parallel top and bottom surfaces yieldingly spaced from each other by the V-shaped spacer and connecting means of said M-shaped corrugated wire springs.

2. A wire spring construction embodying a plurality of sinuously corrugated, M-shaped wire springs having their substantially parallel top and bottom portions lying in horizontal planes when said construction is assembled connected by substantially V-shaped spacer and connecting means with inclined arms bent in localized areas near the apex of the V-shaped means to increase the divergence of the outer portions of said arms over the divergence of their inner portions, and means coupling said springs in axial alignment with each other, some of the M-shaped wire springs being arranged to have the apexes of their V-shaped spacer and connecting means extended in a direction opposite to the direction of the apexes of the V-shaped spacer and connecting means of the other M-shaped wire springs.

3. A wire spring construction embodying a plurality of sinuously corrugated, M-shaped wire springs, each of which includes parallel top and bottom portions lying in horizontal planes when said construction is assembled, means coupling said springs in axial alignment with each other to form elongated spring structures having substantially parallel, yieldingly spaced top and bottom surfaces and simultaneously coupling said elongated spring structures with each other, and two loop-shaped edge wire members having side members bent to form angularly related sections, said edge wire members jointly, substantially enclose and interconnect portions of the top and bottom surfaces of the wire spring construction and yieldingly brace said surfaces from each other.

4. A wire spring construction embodying a plurality of sinuously corrugated, M-shaped wire springs having their substantially parallel top and bottom portions lying in horizontal planes when said construction is assembled, means coupling said springs in axial alignment with each other to form elongated spring structures having substantially parallel top and bottom surfaces and simultaneously coupling the elongated spring structures in parallelly spaced relation with respect to each other, and two loop-shaped edge wire members having side members bent to provide horizontal portions and angularly inclined portions, said edge wire members being arranged in inverted positions with respect to each other and coupled with the top and bottom border edges of said spring construction to jointly substantially enclose and interconnect the top and bottom surfaces of the spring construction and yieldingly brace said surfaces from each other.

5. A wire spring construction embodying a plurality of sinuously corrugated, M-shaped wire springs having substantially parallel top and bottom portions lying in horizontal planes when said construction is assembled and substantially V-shaped spacer and connecting means integrally connecting said top and bottom portions with each other, means coupling said springs with each other to form elongated spring structures having substantially parallel top and bottom surfaces yieldingly spaced from each other and yieldingly coupling the elongated spring structures with each other, and two loop-shaped edge wire members having side members bent to provide portions lying in planes angularly related to each other, said edge wire members being arranged in inverted positions with respect to each other and one of said edge wire members extending through the other one, and said edge wire members being coupled with the top and bottom border edges of said spring construction to jointly enclose and interconnect portions of the top and bottom surfaces of the spring construction, yieldingly brace said surfaces with respect to each other and counteract lateral sway of said wire spring construction.

6. A wire spring construction embodying a plurality of sinuously corrugated, M-shaped wire springs having substantially parallel top and bottom portions lying in horizontal planes when said construction is assembled and substantially V-shaped spacer and connecting means integrally connecting said top and bottom portions with each other, means coupling said springs with each other to form elongated spring structures having substantially parallel top and bottom surfaces yieldingly spaced from each other and yieldingly coupling the elongated spring structures with each other, two loop-shaped edge wire members having side members bent to provide portions lying in planes angularly related to each other, said edge wire members being arranged in inverted positions with respect to each other and one of said edge wire members extending through the other one, and helical coil means coupling said edge wire members with the top and bottom border edges of said spring construction to jointly enclose portions of the top and bottom surfaces of the spring construction by said coil means and edge wire members, yieldingly brace said surfaces from each other and counteract lateral sway of said wire spring construction by said edge wire members.

7. In a wire spring construction a plurality of wire springs coupled with each other to form a spring construction having spaced top and bottom surfaces, and two loop-shaped edge wire members coupled with the top and bottom edges of said spring construction, said edge wire members having side members bent so that each edge wire member partly encircles one of said surfaces and extends to the other one of said surfaces and said edge wire members cooperating in substantially encircling portions of said top and bottom surfaces and bracing same from each other.

8. In a wire spring construction a plurality of wire springs coupled with each other to form a spring construction having spaced top and bottom surfaces, and two loop-shaped edge wire members coupled with the top and bottom edges of said spring construction, said edge wire members having side members bent so that each edge wire member partly encircles one of said surfaces and extends to the other one of said surfaces and one of said edge wire members being extended through the other one, and said edge wire members cooperating in substantially encircling portions of said top and bottom surfaces and bracing same from each other.

9. In a wire spring construction a plurality of wire springs coupled with each other to form a spring construction having spaced top and bottom surfaces, two substantially identically constructed loop-shaped edge wire members coupled with the top and bottom edges of said spring construction, said edge wire members having side members bent so that each edge wire member partly encloses one of said surfaces and extends to the other one of said surfaces, one of said edge wire members being extended through the other one, and helical coil means coupling said edge wire members with the border edges of said spring construction, said coil means substantially enclosing portions of the top and bottom surfaces of said spring construction and the side members of said edge wire members bracing said surfaces from each other.

10. A wire spring for wire spring structures comprising a sinuously corrugated wire bent to form a spring with substantially parallel top and bottom portions, and a V-shaped supporting and spacing portion connected to said top and bottom portions, said V-shaped portion having diverging arms bent in localized areas near the apex of said V-shaped portion to increase the divergence of the outer portions of said arms over the divergence of the inner portions thereof and effect shortening of the active length of said arms when the spring is loaded with a predetermined load.

11. A wire spring for wire spring structures comprising a sinuously corrugated wire bent to form a spring with substantially parallel top and bottom portions, and a V-shaped supporting and spacing portion connecting said top and bottom portions, said V-shaped portion having diverging arms integrally extended from said top and bottom portions and such arms bent in localized areas near the apex of the V-shaped portion to increase the divergence of the outer portions of the arms over the divergence of the inner portions thereof, and effect shortening of the active length of said arms when the spring is loaded with a predetermined load.

SVEND G. BLUMENSAADT.
WILLIAM H. NEELY.
NORMAN A. PAGE.

REFERENCES CITED

The following references are of record in the file of this patent:

UNITED STATES PATENTS

| Number | Name | Date |
|---|---|---|
| 536,123 | Beall | Mar. 19, 1895 |
| 611,274 | Quinn | Sept. 27, 1898 |
| 1,011,515 | Stackhouse | Dec. 12, 1911 |
| 1,486,574 | Franks | Mar. 11, 1924 |
| 1,528,125 | Morse | Mar. 3, 1925 |
| 1,632,936 | Van Hove | June 21, 1927 |
| 2,031,745 | Stubnitz | Feb. 25, 1936 |
| 2,122,979 | Gleason | July 5, 1938 |
| 2,279,336 | Neely | Apr. 14, 1942 |
| 2,341,015 | Blumensaadt et al. | Feb. 8, 1944 |
| 2,373,775 | Neely et al. | Apr. 17, 1945 |
| 2,384,191 | Neely | Sept. 4, 1945 |
| 2,407,933 | Neely | Sept. 17, 1946 |

FOREIGN PATENTS

| Number | Country | Date |
|---|---|---|
| 275,484 | Great Britain | Aug. 11, 1927 |